US008751924B2

(12) United States Patent
Carper et al.

(10) Patent No.: US 8,751,924 B2
(45) Date of Patent: Jun. 10, 2014

(54) RULE-BASED GRID INDEPENDENT OF CONTENT

(75) Inventors: Kathy Carper, Redmond, WA (US); Phil Cupp, Sammamish, WA (US); Erik Daniel Anderson, Redmond, WA (US); Markus Mielke, Redmond, WA (US); Alex Mogilevsky, Bellevue, WA (US); Rossen Atanassov, Bellevue, WA (US); Eugene Veselov, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 80 days.

(21) Appl. No.: 13/094,859

(22) Filed: Apr. 27, 2011

(65) Prior Publication Data
US 2012/0278696 A1 Nov. 1, 2012

(51) Int. Cl.
*G06F 3/00* (2006.01)
(52) U.S. Cl.
USPC ......................................................... 715/234
(58) Field of Classification Search
USPC .......................... 715/234, 243, 253, 254, 255
See application file for complete search history.

(56) References Cited

U.S. PATENT DOCUMENTS

| 6,826,727 | B1 * | 11/2004 | Mohr et al. .................... 715/235 |
| 7,216,298 | B1 | 5/2007 | Ballard et al. |
| 7,500,186 | B2 | 3/2009 | Lehenbauer et al. |
| 7,805,672 | B2 | 9/2010 | Kobashi |
| 2005/0237321 | A1 | 10/2005 | Young et al. |
| 2009/0106648 | A1 | 4/2009 | Mogilevsky et al. |
| 2009/0183065 | A1 | 7/2009 | Endo et al. |
| 2010/0211866 | A1 * | 8/2010 | Nicholas et al. .............. 715/234 |

OTHER PUBLICATIONS

Bos, Bert., "The device-independent browser: CSS and grid layout", Retrieved at << http://www.w3.org/Talks/2005/0513-CSS-WWW2005/all.htm >>, May 13, 2005, pp. 1-9.
"Optimizing Dynamic Page Layout Output", Retrieved at << http://netobjects.com/en/nof/9/00/docs/help/optimizing_dynamic_page_layout_output.htm >>, Retrieved Date: Dec. 10, 2010, pp. 2.
Kyrnin, Jennifer., "Alignment in Web Page Layouts", Retrieved at << http://webdesign.about.com/od/layout/ig/Sample-Web-Layout-Alignments/ >>, Retrieved Date: Dec. 10, 2010, pp. 1.
Deakin, et al., "Flexible Box Layout Module—W3C Working Draft, Jul. 23, 2009", Retrieved at << http://www.w3.org/TR/2009/WD-css3-flexbox-20090723/ >>, Jul. 23, 2009, pp. 17.
Deakin, et al., "Flexible Box Layout Module—W3C Working Draft, Mar. 22, 2011", Retrieved at << http://www.w3.org/TR/css3-flexbox/ >>, Mar. 22, 2011, pp. 16.

(Continued)

*Primary Examiner* — Kyle Stork
(74) *Attorney, Agent, or Firm* — Tony Azure; Andrew Sanders; Micky Minhas

(57) ABSTRACT

Presentation of accessible content is in accordance with a grid established by rules independent of the content. Different rules establish different grids utilizable with the same content, thereby enabling proper formatting across a wide range of devices and displays. The rules provide for fixed size and auto sized column widths and row heights. Additionally, the rules provide for column widths and row heights size based on fractional weighting of the remaining space after the fixed size and auto sized grid members are accounted for. The grid establishes a coordinate system onto which content is "hung" by aligning an aspect of the content with a coordinate point. Content is hung by reference to its beginning, its end, its center point, or, alternatively, content can be specified to be stretched to fit the width of the column and the height of the row with which it is associated.

20 Claims, 6 Drawing Sheets

(56) References Cited

OTHER PUBLICATIONS

"CSS Template Layout Module—W3C Working Draft Apr. 29, 2010", Retrieved at << http://www.w3.org/TR/css3-layout/>>, Editor: Bert Bos and Cesar Acebal, Apr. 29, 2010, pp. 33.

"CSS Grid Alignment Level 3—W3C Editor's Draft Mar. 8, 2011", Retrieved at << http://dev.w3.org/csswg/css3-grid-align/ >>, Editor: Alex Mogilevsky, Phil Cupp, Markus Mielke, Daniel Glazman, Mar. 8, 2011, pp. 36.

"CSS Grid Alignment Level 3—W3C Editors Draft Nov. 2, 2010", Retrieved at << http://dev.w3.org/cvsweb/~checkout~/csswg/css3-grid-align/Overview.html?rev=1.1;content-type=text%2Fhtml >>, Editor: Alex Mogilevsky, Phil Cupp, Markus Mielke, Nov. 2, 2010, pp. 16.

\* cited by examiner

RULE-BASED GRID INDEPENDENT OF CONTENT

BACKGROUND

Network-accessible content can be accessed from a myriad of devices that can have widely differing capabilities, including display capabilities. One type of device that can access network-accessible content are traditional computing devices, including laptop and desktop computers, which typically comprise a sufficiently sized display to enable all but the most complex of network-accessible content to be displayed without egregious formatting changes. Another type of device that can access network-accessible content are smaller, more portable, and often more limited computing devices, such as tablet computing devices, personal digital assistants, smartphones, and other like devices which typically may not comprise, due to their portability and dedicated functionality, large displays. Accessing network-accessible content on such devices can either result in a sub-optimal viewing experience for the user, or can require a substantial amount of reformatting to properly display the network-accessible content on the limited displays of such devices.

Often, the authors of network-accessible content desire to make such content both as broadly available as possible, and as easy to consume as possible. For example, one type of network-accessible content that is designed to be both broadly available and easily consumable are the ubiquitous webpages that comprise the World Wide Web. Traditionally, the authors of such webpages desire that their content is presented in a controlled and visually pleasing manner irrespective of the type of computing device utilized to access such content. Thus, traditionally, the authors of such webpages desire that their content appear in a pleasing manner whether it is viewed on a computing device having a large display, such as a laptop or desktop computer, or whether it is viewed on a computing device having substantially smaller displays, such as tablet computing devices, personal digital assistants, or smart phones.

While traditional text-based content can be fairly easily reformatted for any size display, such as, for example, by simply changing the length of a line of text in accordance with the width of the display, other content can be more difficult to format such that it appears in a pleasing manner on a wide variety of displays and display sizes. For example, tables or tabular structures can be difficult to reformat for displays that are not as wide as the table. Often, such reformatting results in visually unappealing layouts, with elements that were supposed to be proximate to one another being placed further apart and in areas that their relationship is no longer evident. Other layout formats, that the authors of webpages may desire to use in order to arrange and present visually pleasing content, can be likewise difficult to reformat for small displays.

SUMMARY

In one embodiment, a grid can be defined and established by a set of rules that can be established independently of the content that will be associated with the grid. The content can then be changed without changing the set of rules that establish the grid and, likewise, the set of rules that establish the grid can be changed without affecting the content.

In another embodiment, the rules that establish the grid can provide for row widths and column heights that are automatically established based on the content that is associated with those rows and columns.

In a further embodiment, the rules that establish the grid can provide for row widths and column heights that are established based on a fractional weighting of the "left over" space that remains integrated after fixed dimension and automatically established rows and columns are provided for.

In a still further embodiment, the grid that is established can act as a coordinate system and content can be "hung" off of any intersection of gridlines. The hanging of content can be aligned with the beginning of the content, the center of the content, the end of the content, or, alternatively, the content can be stretched according to the widths and heights of rows and columns with which the content is associated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
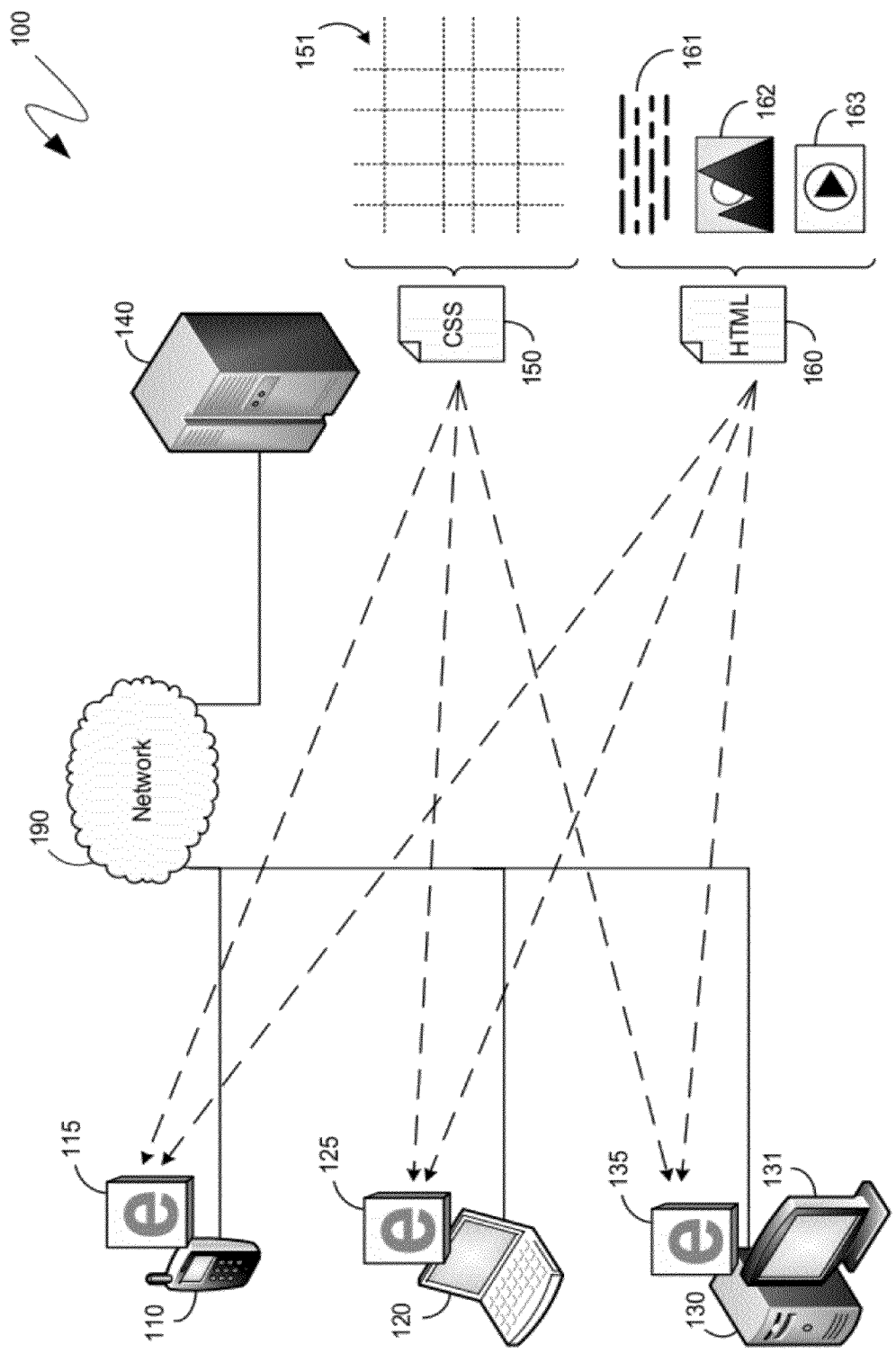
FIG. 1 is a block diagram of an exemplary independent set of grid-establishing rules and content that can be displayed based on the established grid.

The following description relates to the presentation of content in accordance with a grid that is established by a set of rules that are independent of the content, such that different sets of rules can establish different grids to be utilized with the same content. The set of rules can provide for fixed size column widths and row heights as well as auto sized column widths and row heights. Additionally, the set of rules can provide for column widths and row heights that are sized based on a fractional weighting of the remaining space after the fixed size and auto sized members of the grid are accounted for. The grid can establish a coordinate system onto which content can be "hung", such as by aligning an aspect of the content with a coordinate point on the grid. Content can be hung on the grid by reference to its beginning, its end, its center point, or, alternatively, content can be specified to be stretched to fit the width of the column, and the height of the row, with which such content is associated.

For purposes of illustration, the techniques described herein make reference to existing and known networking infrastructure, such as the ubiquitous Internet and World Wide Web (WWW). Also for purposes of illustration, the techniques described herein make reference to existing and known protocols and languages, such as the ubiquitous HyperText Transfer Protocol (HTTP) and the equally ubiquitous HyperText Markup Language (HTML) and the Cascading Style Sheets (CSS) stylesheet language. Such references, however, are strictly exemplary and are not intended to limit the mechanisms described to the specific examples provided. Indeed, the techniques described are applicable to any environment and language within which a set of rules can be established to generate a grid and associate content, that is otherwise independent of the set of rules, with that grid.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 100 is shown, comprising various types of computing devices that can access network-accessible content, such as over the network 190. Among the types of computing devices illustrated are a smart phone 110, a portable computing device 120, and a desktop computing device 130. Each of the computing devices 110, 120 and 130 can be executing a version of a browser application program that can access network accessible content and display such content on the computing device on which it is executing. In the exemplary system 100 illustrated in FIG. 1, the computing devices 110, 120 and 130 can be executing browser application programs 115, 125 and 135, respectively.

As will be recognized by those skilled in the art, the display capabilities of the computing devices 110, 120 and 130 can vary dramatically. For example, the smart phone 110 can comprise a small display that is typically limited by the requirement that the smartphone 110 be capable of being carried in a pocket or small handbag. Similarly, as another example, the portable computing device 120, while comprising a display that is typically larger than that of the smartphone 110, can, nevertheless, comprise a display whose size is limited by the requirement that the portable computing device 120 be practical to be carried and utilized while traveling. On the other hand, the desktop computing device 130 can be connected to one or more display devices, such as the display device 131, whose size can often be substantially larger than the display of the portable computing device 120. Such a disparity in the abilities of computing devices, such as the computing devices 110, 120 and 130, to display content can be difficult to account for when designing content that is intended to be accessed by, and viewed upon, such a myriad of computing devices. Content that is aligned properly on a computing device with a large display, such as the desktop computing device 130, may not appear properly formatted on a computing device with a small display, such as the smartphone 110. Similarly, content that is formatted for display on a computing device of the small display may not be compelling when viewed on a computing device with a large display.

In one embodiment, network-accessible content that is intended to be accessed by a myriad of computing devices, such as the computing devices 110, 120 and 130, can be formatted in accordance with a grid that is established by a set of rules that are independent of the network accessible content. In this specific example shown in the system 100 of FIG. 1, the network-accessible content can be represented by the HTML data source 160, which can comprise, or reference, textual content 161, graphical content 162, video content 163, or other like hypermedia content. Again, as indicated previously, reference to HTML is strictly exemplary and is only intended to provide context for the descriptions below. The mechanisms described below, as will be recognized by those skilled in the art, can be equally implemented by other mechanisms that define content that can be accessed over a network, and do not require any specific aspect or attribute of HTML. In addition to the HTML data source 160, a separate file, or other data container, can comprise a set of rules that can implement a grid that can be utilized to format and define the display of the content from the data source 160. In the specific example illustrated by the system 100 of FIG. 1, such a separate file can be in the form of a CSS data source 150 that can comprise rules expressed in CSS for establishing a grid 151. Again, as in the case of the HTML data source 160, reference to CSS is strictly exemplary, and is only intended to provide context for the descriptions below, since, as will be recognized by those skilled in the art, the mechanisms described below can be equally implemented by other style-defining languages and do not require, or rely upon, any specific aspect or attribute of CSS.

As is illustrated by the system 100 of FIG. 1, and in a manner well known to those skilled in the art, a browser application program can receive both the HTML data source 160 and the CSS data source 150, and can format the content specified by the HTML data source 160 in the manner specified by the CSS data source 150. Thus, as shown, each of the browser application programs 115, 125 and 135 can receive both the HTML data source 160 and the CSS data source 150. In one embodiment, the set of rules enumerated by the CSS data source 150 can be conditioned based on the type of computing device receiving these data sources. Thus, for example, the browser application program 115 executing on the smartphone 110 can resolve a set of conditional statements and can select appropriate ones of the rules in the CSS data source 150 that can then, in turn, define a grid 151 appropriate for the limited display capabilities of the smartphone 110. Similarly, the browser application program 135 executing on the desktop computing device 130 can, likewise, resolve the set of conditional statements and select appropriate ones of the rules in the CSS data source 150 that can then, in turn, define a grid 151 appropriate for the much larger display canvas provided by the one or more monitors 131 communicationally coupled with the desktop computing device 130. In such a manner, the presentation of network accessible content can be formatted appropriately for differing computing devices comprising differing display capabilities.

Figure 2:
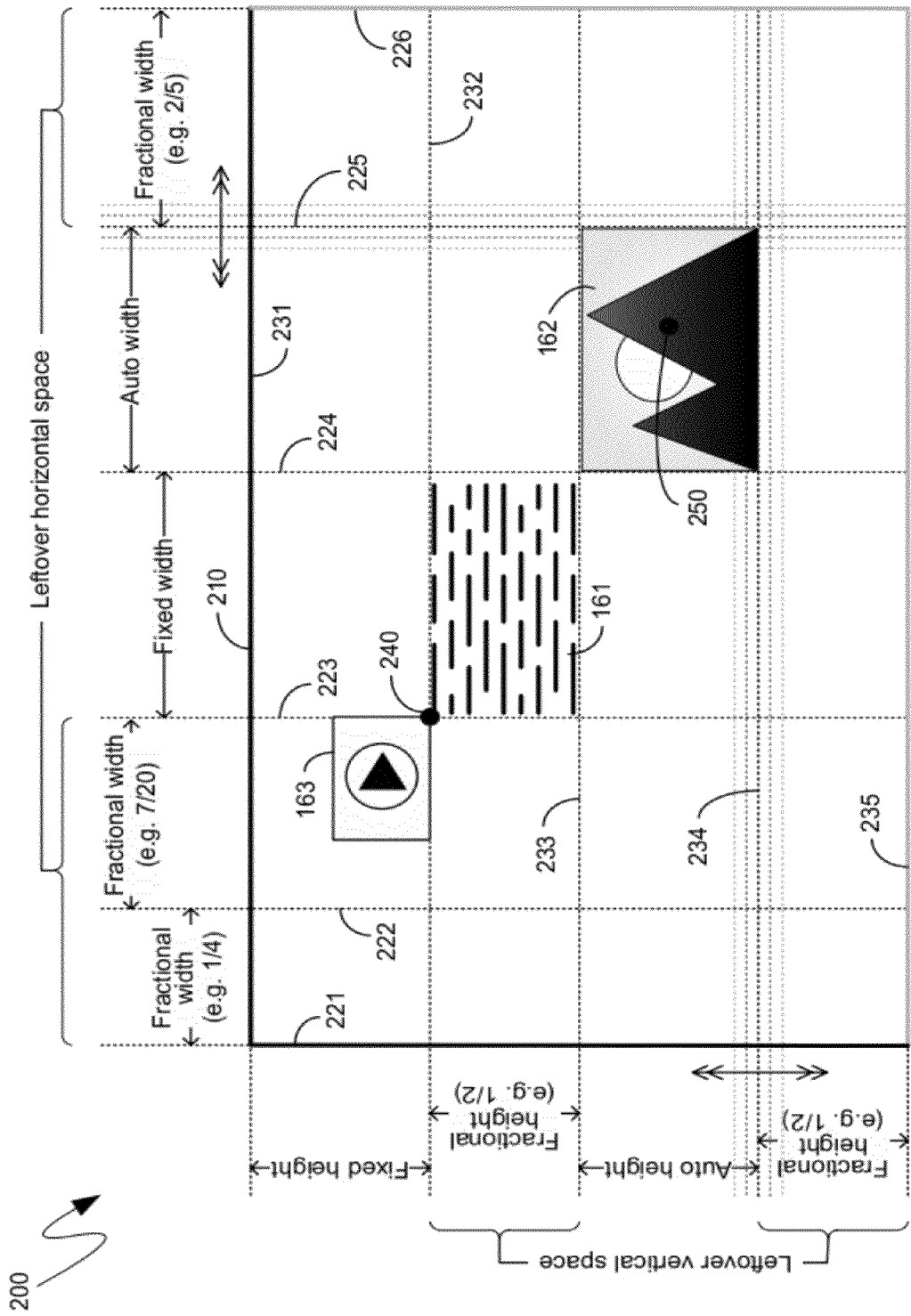
FIG. 2 is a diagram of an exemplary grid established by a set of rules and independent of the content displayed thereon.

Turning to FIG. 2, the system 200 shown therein illustrates an exemplary grid 210 that illustrates some of the elements that can be established, and provided for, by a set of rules, such as those defined in the CSS data source 150 shown in FIG. 1. In one embodiment, the grid 210 represents a coordinate system on which content can be "hung", or otherwise affixed to, and displayed in reference to. Thus, the system 200 shown in FIG. 2 illustrates an exemplary of fixing of the content 161, 162 and 163 onto the grid 210.

In one embodiment, the grid 210 can comprise gridlines, including vertical gridlines, such as the gridlines 221, 222, 223, 224, 225 and 226, including horizontal gridlines, such as the gridlines 231, 232, 233, 234 and 235. Although illustrated within the context of vertical and horizontal gridlines, grids based on a Cartesian coordinate system, or grids whose gridlines are angled with respect to horizontal and vertical, including grids whose gridlines do not intersect 90°, are equally applicable to, and implementable by, the mechanisms described below. Returning to the exemplary grid 210 shown in the system 200 of FIG. 2, the vertical gridlines can define "columns", the horizontal gridlines can define "rows", and the intersections of columns and rows can define individual "cells". Additionally, the term "tracks" will be utilized herein to mean either a column or a row.

The grid 210 can comprise a specified area of the network-accessible content, such that other aspects of the network-accessible content, including other content, may be positioned outside of, or otherwise independently of, the grid 210. As such, in one embodiment, the grid 210 can be defined in terms of a specific width and a specific height within the greater context of the network-accessible content. Alternatively, in another embodiment, the grid 210 need not be defined with a specific width or height, and can instead be determined dynamically, such as in the manner described in detail below. To illustrate such alternative embodiments, the gridlines 235 and 236 are shaded gray, instead of black, indicating that the right and bottom limits of the grid 210 may either be specifically defined, or dynamically established.

The positions gridlines of the grid 210 can be defined via a number of mechanisms. One simple mechanism by which the positions of the gridlines of the grid 210 can be defined can be by the specification of fixed width columns and fixed height rows. For example, as illustrated by the system 200 of FIG. 2, the gridlines 223 and 224 can be positioned such that the distance between them is a fixed width. Similarly, the gridlines 231 and 232 can be positioned such that the distance between them is a fixed height.

Alternatively, gridlines can be positioned based on an automatic mechanism that adjusts row width and column height based on the content that is associated with the row or column. For example, the gridline 225 can be movable in order to automatically adjust the width of the column defined by the gridline 224 and the gridline 225. As will be described in further detail below, the automatic positioning of the gridline 225 can be based on the content associated with the column defined by the gridline 224 and the gridline 225, as well as the width of the grid 210, and other content within the grid. In a similar manner, gridline 234 can, likewise, be movable in order to automatically adjust the height of the row defined by the gridline 233 and the gridline 234. As will be described in further detail below, the automatic positioning of the gridline 234 can be based on the content that is associated with the row defined by the gridline 233 and the gridline 234 to provide for the placement of that content fully within that row, and without clipping, or otherwise not displaying, all of the content.

In one embodiment, the positions of gridlines within the grid 210 can be established based on fractional widths and heights, or weighted widths and heights. More specifically, the fixed size columns and rows, and the columns and rows whose sizing is automatically adjusted, may not consume all of the space that was assigned to the grid 210. In such a case, "leftover" space may exist that can be distributed among the fractional, or weighted, columns and rows in accordance with their specified fractions, or their specified weighting. Although illustrated in the exemplary system 200 of FIG. 2 as being positioned on the extremities of the grid 210, there exists no such requirement and, instead, fractional width columns, and fractional height rows, can be positioned anywhere within the grid 210.

In the exemplary system 200 of FIG. 2, the grid 210 comprises a fixed width column defined by the gridlines 223 and 224, and an automatic width column defined by the gridlines 224 and 225. Those two columns, however, as illustrated, do not comprise all of the width assigned to the grid 210. Instead, even after accounting for those two columns, there remains leftover horizontal space, such as is illustrated in FIG. 2. Such leftover horizontal space can be distributed among fractional width columns, such as those defined by the gridlines 221 and 222, 223 and 224, and 225 and 226, respectively. As illustrated, the fractional width column defined by the gridlines 221 and 222 can be defined as comprising one quarter of the leftover horizontal space. Similarly, as also illustrated, the fractional width column defined by the gridlines 222 and 223 can be defined as comprising 7/20 of the leftover horizontal space, and the fractional width column defined by the gridlines 225 and 226 can be defined as comprising 2/5 of the leftover horizontal space. Expressed differently, though achieving the same result, the fractional width column defined by the gridlines 222 and 223 can be assigned a weighting that is 1.4 times greater than the weighting that is assigned to the fractional width column defined by the gridlines 221 and 222. Similarly, the fractional width column defined by the gridlines 225 and 226 can be assigned a weighting that is 1.6 times greater than the weighting assigned to the fractional width column defined by the gridlines 221 and 222.

In a similar manner, fractional height rows can be established that can receive any leftover vertical space. For example, the row defined by the gridlines 232 and 233, and the row defined by the gridlines 234 and 235 can be fractional height rows that can each be defined as comprising one half of the leftover vertical space. Expressed differently, though again achieving the same result, the fractional height rows referenced above can be assigned equal weightings, rather than specific fractions of the leftover vertical space.

The grid 210 can, in one embodiment, define a coordinate system on which content can be "hung", or associated with. For example, as illustrated in the exemplary system 200 of FIG. 2, the intersection of the gridlines 223 and 232 can form a coordinate point 240 that can be utilized as a reference point for the presentation of content. For purposes of illustration, textual content 161 and video content 163 are illustrated in the exemplary system 200 of FIG. 2 as being presented in accordance with the location of the coordinate point 240. In one embodiment, content can be aligned with a coordinate point, such as the coordinate point 240, based on the start of that content. Typically, the "start" of content is the top left-hand corner of such content. However, in certain regions and cultures, the "start" of content can be the top right-hand corner of such content. Consequently, as utilized herein, reference to the "start of content" means that extremity of the content from which a user to whom such content is being presented would begin viewing, or otherwise consuming, such content. As can be seen, in the exemplary system 200 of FIG. 2, the start of the textual content 161 can be aligned with the coordinate point 240. As such, the content 161 can be considered to be part of the column defined by the gridlines 223 and 224 and can, likewise, be considered to be part of the row defined by the gridlines 232 and 233.

In another embodiment, content can be aligned with a coordinate point, such as the coordinate point 240, based on the end of that content. Typically, the "end" of content is the bottom right-hand corner of such content, though, again, in certain regions and cultures, the "end" of content can be the bottom left-hand corner of such content. Consequently, as utilized herein, reference to the "end of content" means that extremity of the content at which a user to whom such content is being presented would end viewing, or otherwise consuming, such content. In the exemplary system 200 of FIG. 2, the end of the video content 163 can be aligned with the coordinate point 240. As such, the content 163 can be considered to be part of the column defined by the gridlines 222 and 223 and can, likewise, be considered to be part of the row defined by the gridlines 231 and 232.

In addition to aligning content with coordinate points of the grid 210 based on the start or end of the content, another embodiment contemplates that content can be aligned with a coordinate point based on the center, or midpoint, of that content. For example, in the exemplary system 200 of FIG. 2, a coordinate point 250 is shown in the center of a cell defined by the gridlines 224 and 225 and the gridlines 233 and 234. Content, such as the graphical content 162, can be aligned with the coordinate point 250 based on the midpoint of the graphical content 162, as shown. Additionally, as also shown, since the column defined by the gridlines 224 and 225 is an auto width column, its width can be adjusted such that the graphical content 162 fits within the gridlines 224 and 225. Such a width adjustment is illustratively shown by the dashed lines surrounding the gridline 225. In a similar manner, the row defined by the gridlines 233 and 234 is an auto height row and its height can be adjusted such that the graphical content 162 fits within the gridlines 233 and 234. Again, such a width adjustment is illustratively shown by the dashed lines surrounding the gridline 234.

In yet another embodiment, content can be aligned with the grid 210 such that the content is resized to fully occupy a space between gridlines. Such an alignment can be referred to as a stretch alignment, and can be particularly useful for graphical content that can be resized using known image manipulation techniques. Stretch aligned content can still have a specified size, but that size can represent a minimum, and the content can be resized to a larger size to fully occupy a space between gridlines. In combination with auto-sized columns and rows, content that is stretch aligned can be sized based on a collective measurement, such as that derived from the mechanisms described in detail below.

Because content can be aligned with the coordinates established by a grid, such as the grid 210, in a variety of different ways, content authors utilizing the described mechanisms to arrange and format the presentation of their content can choose to overlap the content such that portions of at least two different pieces of content are located in the same visual area. More specifically, while content can affect the positions of gridlines, such as in the manner described in detail below, content does not affect other content. Consequently, two or more pieces of content can occupy the same visual area, thereby providing for the above-referenced overlapping. For example, not specifically shown in the exemplary system 200 of FIG. 2 to preserve illustrative simplicity and clarity, the textual content 161 could have been aligned with a coordinate point represented by the intersection of the gridlines 222 and 210, instead of having been aligned with the coordinate point 250 as shown. In such an exemplary alternative alignment, the textual content 161 can have ended up overlapping at least a portion of the video content 163, that is aligned with a different coordinate point, namely the coordinate point 240. In a like manner, by utilizing differing alignments, such as alignments based on the start, the end, and the center, of the content, and by aligning content based on different coordinate points, authors of network accessible content can utilize the described grid structure, such as the exemplary grid 210 shown in FIG. 2, to position content such that there are multiple levels of content, and such that some content overlaps other content. The content authors can, thereby, create effects such as backdrops, layering, or more complex graphical layout structures. To provide content authors with the ability to control such overlapping, content can be positioned on a grid, such as the exemplary grid 210 shown in FIG. 2, in accordance with a "layering" specified by the content author. More specifically, when positioning content on a grid, such as in the manner described in detail below, content having a "higher" layer can be positioned after content having a "lower" layer, thereby providing that content having a "higher" layer is visually displayed as being overlapped over content having a "lower" layer.

Additionally, although not specifically illustrated in FIG. 2, content is not limited to a single cell and can, instead, spread across multiple cells. As indicated previously, content is associated with coordinate points on the grid, as opposed to being limited to specific cells. Thus, for example, content can be specified as spanning two or more columns in width, or two or more rows in height. In such a case the sizing of individual columns and rows, described in detail below, takes into account content spanning across those columns and rows.

In one embodiment, columns or rows can be automatically added to a grid to accommodate the specifications set forth by content authors. For example, if a content author were to specify that one content element was to be associated with a first column and another content element was to be associated with a third column, but provided no definition for any columns, or did not establish a grid with at least three columns, then the additional columns can be created to enable the reference to the "third" column to be resolvable. In such a case, it is likely that the second column that would be created would be a column without content and, thus, without any width. Such a column can be referred to as an "implicit" column. "Implicit" rows can be created in an analogous manner. Similarly, in one embodiment, content can be automatically placed onto a grid, with additional rows and columns being created, as needed, such that each content element receives its own cell in the grid.

Figure 3A:
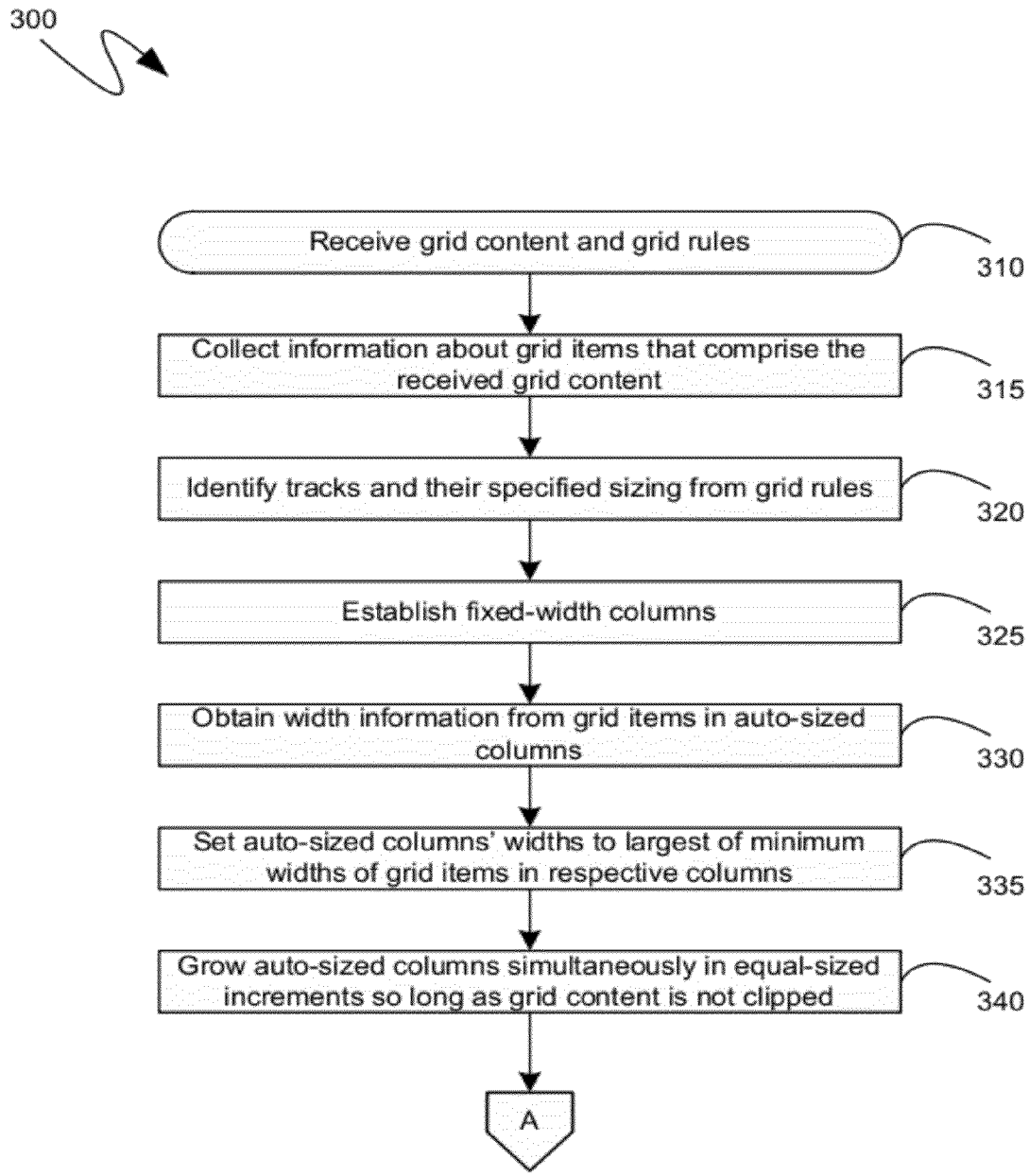
FIGS. 3a, 3b and 3c are a flow diagram of an exemplary operation of the creation of a grid and the display of content thereon.

Turning to FIG. 3*a*, the flow diagram 300 shown therein illustrates an exemplary series of steps that can be performed by, for example, a browser or other application program that can receive and display network-accessible content that utilizes the above described grid coordinate structure system to arrange and format content. Initially, as indicated by the step 310, content that is to be arranged and formatted in accordance with a defined grid coordinate structure system, referred to hereinafter as "grid content" can be received, as can the set of rules by which the grid coordinate structure system will be constructed. As indicated previously, the grid content received at step 310 can be independent of the grid rules that are received as part of the same step. For example, as illustrated by the system 100 of FIG. 1, the grid content can be specified in an HTML document, while the grid rules can be specified utilizing CSS in a separate, independent, document.

Once the grid content and the grid rules have been received, such as at step 310, processing can proceed to step 315, at which point information can be collected about the grid item that comprises the grid content that was received at step 310. The information that can be collected at step 315 can include sizing information and information regarding which one or more coordinate points each grid item is associated with, and the manner in which it is associated, such as, for example, whether the coordinate point is aligned with the beginning, the end, or the center of a particular grid item. In one embodiment, the sizing information that can be received from the grid items, at step 315, can include both minimum and maximum sizing information. For some content, such as an image, the minimum and maximum sizing information may be the same. Conversely, for other content, such as textual content, the minimum and maximum sizing information can reflect the specific words utilized, or other aspects of the textual content. For example, textual content can report a minimum width value that is equivalent to the longest word contained in the textual content. Similarly, textual content can report a maximum width value that is equivalent to all of the words contained in the textual content were they to be all displayed in one line.

In one embodiment, sizing schemes can be specified for the determination of the minimum and maximum sizing information. A single sizing scheme can be specified for both the determination of the minimum sizing information and the determination of the maximum sizing information, or, alternatively the sizing schemes for the determination of the minimum sizing information can be specified independently of the sizing schemes to be utilized in determining the maximum sizing information. As will be recognized by those skilled in the art, sizing schemes can specify particular algorithms by which content can determine and report a minimum or maximum size.

At step 320, tracks, such as columns and rows, can be identified based on the grid rules, and the grid rules can likewise be consulted to identify specified sizing of those tracks, including, for example, fixed size tracks, auto sized tracks, and fractional sized tracks, such as those described in detail above. As will be recognized by those skilled in the art, the ordering of the steps 315 and 320 shown in the flow diagram 300 of FIG. 3a is merely exemplary, and the ordering of those steps could be reversed, or, indeed, could be performed in parallel with one another.

Processing can then proceed with the building of a grid in accordance with the rules received at step 310 and parsed at step 320. At step 325, fixed width columns can be established within the area specified to contain the grid. For example, within the context of a webpage, the HTML utilized to lay out the webpage can specify a portion of that webpage within which content is to be arranged in accordance with a grid structure, and can reference the external, and independent, CSS rules in accordance with which the grid is to be constructed. Thus, at step 325, when the building of the grid is commenced, such a building can occur within the portion of, for example, the webpage at which the grid was specified to be placed.

Once fixed width columns have been established at step 325, processing can proceed to establish auto-sized columns whose widths can vary in accordance with the content contained within those columns, such as detailed above. Initially, at step 330, width information can be obtained for those grid items that are associated with auto-sized columns. Such width information can originally have been obtained at step 315 as part of the information collected at that step. Subsequently, at step 335, the auto-sized columns' widths can be set to the largest minimum width value obtained from a grid item in that column. Such a width can represent the minimum width for that auto-sized column, given the content contained within that column. At step 340, the auto-sized columns can have their widths increased, or "grown", from the minimum established at step 335. In one embodiment, at step 340, the auto-sized columns can have their widths increased in the equal sized increments, such that each column's width is increased by the same amount. Such an increasing can proceed so long as content within the grid is not clipped, or otherwise hidden from view. The widths of the auto-sized columns can be established with the completion of step 340.

Figure 3B:
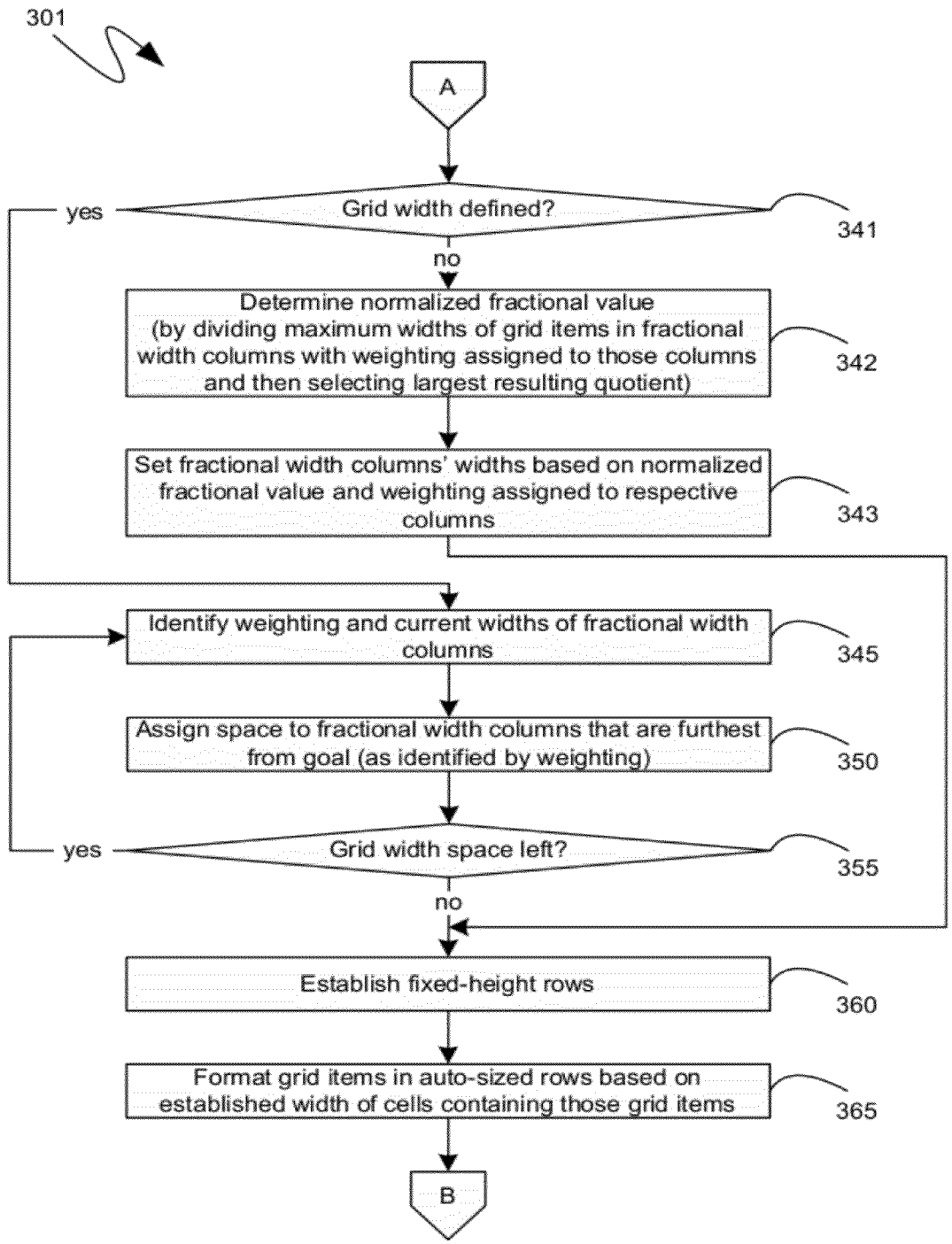

As indicated above, there may exist additional horizontal space that is leftover within the area allocated to the grid even after the fixed-width columns were established at step 325 and the auto-sized columns were established at step 340. In one embodiment, if such leftover horizontal space exists, it can be allocated to fractional width columns in accordance with their weighting, or the fractional values assigned to them. Turning to FIG. 3b, the flow diagram 301 illustrates aspects of such a mechanism in greater detail. More specifically, as shown in the flow diagram 301 of FIG. 3b, at step 341 a determination can initially be made as to whether the overall grid has been assigned a specific width. If it is determined, at step 341, that the grid has been assigned a specific width, then processing can proceed with step 345, where, at step 345, the weighting, or fractional values, assigned to the fractional width columns can be identified and can be compared with the current width, if any, of those fractional width columns. For example, content within, or associated with, fixed width columns and auto-sized columns can also impact the sizing of fractional width columns and, consequently, the performance of the above described steps can have already resulted in at least some fractional width columns having some width already assigned to them.

The weighting, or fractional value, assigned to fractional width columns can represent a "goal" as to those columns' widths. At step 350, the current width of the fractional width columns can be compared to this "goal", as identified by the weighting, or fractional value, and those fractional width columns that are furthest from their goal can have space, or additional width, assigned to them. Subsequently, at step 355, a determination can be made as to whether there is any further horizontal, or width, space left within the space that was assigned to the grid. If, at step 355, it is determined that additional horizontal space remains, processing can return to step 345 and can perform steps 345 and 350 again, assigning space, or more width, to those fractional width columns that are now further from their goal.

Figure 4:
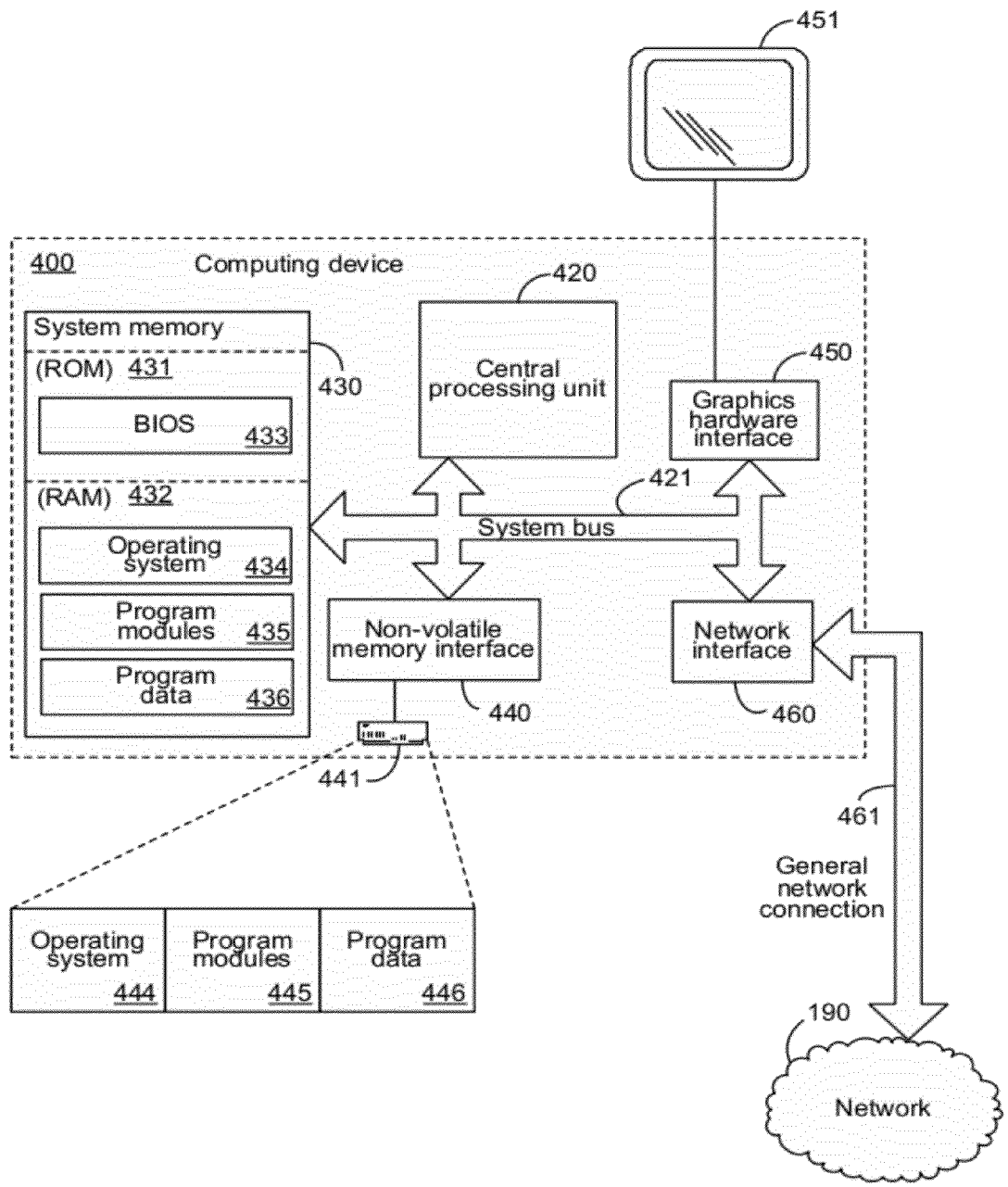
FIG. 4 is a block diagram of an exemplary computing device.

However, if, at step 355, it is determined that there is no horizontal space left to assign, then processing can proceed with step 360, as described further below. If, however, back at step 341, it is determined that the grid does not have a defined width, then such a grid can be allowed to expand, in a horizontal direction, as the content associated with the grid may require. In the case of such a determination, at step 341, processing can proceed to step 342 where a normalized fractional value can, initially, be determined, to enable a further determination of the widths to assign to fractional width columns. As indicated in FIG. 4, the normalized fractional value can be determined, at step 342, by dividing the maximum widths of grid items in a fractional width column by the weighting assigned to that fractional width column. The largest resulting quotient can be the normalized fractional value determined at step 342. In one embodiment, although not specifically illustrated as a separate step in the flow diagram 301 of FIG. 3b, the maximum widths of grid items in a fractional width column can be obtained by polling those items in the same manner as described in detail above in conjunction with step 330.

Figure 3C:
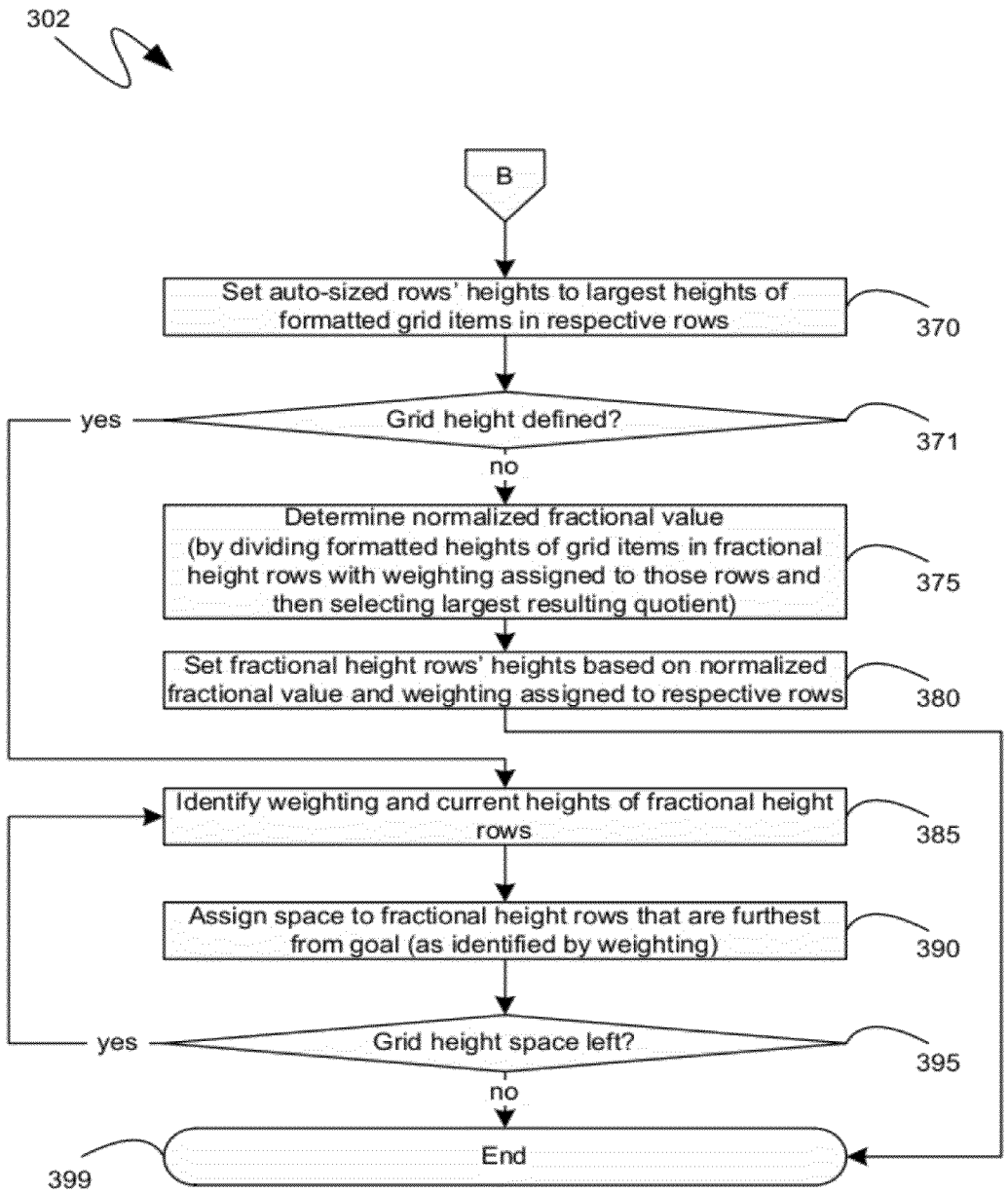

Once the normalized fractional value is determined, at step 342, processing can proceed to step 343, where such a determined fractional value can be utilized to establish the widths of the fractional width columns in a grid whose overall width is not specifically defined. More particularly, at step 343, the width of a fractional width column can be established by multiplying the normalized fractional value determined at step 342 with the weighting assigned to that fractional width column. Processing can then proceed with step 360. As indicated in the flow diagram 301 of FIG. 3b, at step 360, the fixed-height rows can be established within the space allocated to the grid. Subsequently, the auto-sized rows can be established in a manner analogous to that described above for the auto-sized columns. More specifically, at step 365, the grid items that are associated with auto-sized rows can be formatted based on the width of the cells containing those grid items, since such a width would have been established previously via one or more of the steps 325 through 350, shown in FIGS. 3a and 3b, and described in detail above. For example, once the width of a column that comprises textual content has been established, the height of that textual content can be known, since the quantity of textual content is fixed. Turning to FIG. 3c, as indicated in the flow diagram 302 shown therein, at step 370, the height of an auto-sized row can be set to the largest height of content within that row, given the formatting performed at step 365.

Processing can then proceed to establish the height of any fractional rows that may have been specified by the grid rules received at step 310. Initially, at step 371, a determination can be made as to whether the grid height was defined, much in the same manner as the determination of whether a grid width was defined at step 341, described above. If, at step 371, it is determined that the grid does not have a specified height, and can be allowed to grow dynamically, then processing can proceed to step 375 at which point a normalized fractional value can be determined in a manner analogous to that described in detail above with reference to step 342. More specifically, at step 375, the normalized fractional value can be determined by first determining the formatted heights of content in the fractional height rows, given that the width of the cells of such rows would have been determined in the manner described above, and then dividing that value by the fraction, or weight, assigned to the fractional height row comprising that content. The normalized fractional value can then be the largest resulting value. Once a normalized fractional value is established, at step 375, the fractional height rows' heights can be set by multiplying the weighting, or fraction, assigned to the fractional height rows, with that normalized fractional value. Such a step can be performed at step 380. Subsequently, having established the gridlines of the grid, the relevant processing can end at step 399.

Conversely, if, at step 370, it is determined that the grid was assigned a specified height, the processing can proceed with steps 385, 390 and 395, through which the height of the fractional height rows can be established in a manner analogous to that described above in establishing the width of fractional width columns. More specifically, at step 385, the weighting, or fractional values, assigned to the fractional height rows can be determined and can be compared to the current heights of those fractional height rows, if any. Subsequently, at step 390, space can be assigned to those fractional height rows that are furthest from their goals, as determined by the weighting, or fractional values, assigned to those fractional height rows. At step 395, a determination can be made if additional grid height space remains. If, at step 395, it is determined that additional grid height space does remain, then processing can return to step 385, and repeat the assigning of additional space to those fractional height rows that are the furthest from their respective goals. If, however, at step 395, it is determined that no additional grid height space remains, then the relevant processing can end at step 399. In such a manner, a grid, on which content can be hung, can be established utilizing rules that are independent of that content.

Turning to FIG. 4, an exemplary computing device 400 is illustrated. The exemplary computing device 400 can be any one or more of the computing devices illustrated in FIG. 1, including the smartphone 110, the portable personal computing device 120 and the desktop computing device 130, whose operation was described in detail above. The exemplary computing device 400 of FIG. 4 can include, but is not limited to, one or more central processing units (CPUs) 420, a system memory 430, that can include RAM 432, and a system bus 421 that couples various system components including the system memory to the processing unit 420. The system bus 421 may be any of several types of bus structures including a memory bus or memory controller, a peripheral bus, and a local bus using any of a variety of bus architectures. The computing device 400 can optionally include graphics hardware, such as for the display of the above described grid-aligned content, that can include, but is not limited to, a graphics hardware interface 450 and a display device 451. Depending on the specific physical implementation, one or more of the CPUs 420, the system memory 430 and other components of the computing device 400 can be physically co-located, such as on a single chip. In such a case, some or all of the system bus 421 can be nothing more than silicon pathways within a single chip structure and its illustration in FIG. 4 can be nothing more than notational convenience for the purpose of illustration.

The computing device 400 also typically includes computer readable media, which can include any available media that can be accessed by computing device 400 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and the aforementioned RAM 432. A basic input/output system 433 (BIOS), containing the basic routines that help to transfer information between elements within computing device 400, such as during start-up, is typically stored in ROM 431. RAM 432 typically contains data and/or program modules that are immediately accessible to and/or presently being operated on by processing unit 420. By way of example, and not limitation, FIG. 4 illustrates the operating system 434 along with other program modules 435, and program data 436, which can include the above referenced network browser.

The computing device 400 may also include other removable/non-removable, volatile/nonvolatile computer storage media. By way of example only, FIG. 4 illustrates the hard disk drive 441 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440.

The drives and their associated computer storage media discussed above and illustrated in FIG. 4, provide storage of computer readable instructions, data structures, program modules and other data for the computing device 400. In FIG. 4, for example, hard disk drive 441 is illustrated as storing operating system 444, other program modules 445, and program data 446. Note that these components can either be the same as or different from operating system 434, other program modules 435 and program data 436. Operating system 444, other program modules 445 and program data 446 are given different numbers hereto illustrate that, at a minimum, they are different copies.

The computing device 400 can operate in a networked environment using logical connections to one or more remote computers. The computing device 400 is illustrated as being connected to a general network connection 461 through a network interface or adapter 460 which is, in turn, connected to the system bus 421. In a networked environment, program modules depicted relative to the computing device 400, or portions or peripherals thereof, may be stored in the memory of one or more other computing devices that are communicatively coupled to the computing device 400 through the general network connection 461. It will be appreciated that the network connections shown are exemplary and other means of establishing a communications link between computing devices may be used.

As can be seen from the above descriptions, mechanisms for formatting network-accessible content in accordance with an independent rule-generated grid have been presented. In view of the many possible variations of the subject matter described herein, we claim as our invention all such embodiments as may come within the scope of the following claims and equivalents thereto.

We claim:

1. One or more computer-readable storage media comprising computer-executable instructions for formatting content in accordance with a grid established by rules that are independent of the content, the computer-executable instructions directed to steps comprising:
    obtaining the rules defining the grid, the rules being independent of, and separate from, the content;
    polling the content for minimum and maximum sizing information;
    generating the grid in accordance with the rules, the generating the grid comprising: generating automatically sized columns and rows, whose sizing is based on the content; and generating fractionally weighted columns and rows, whose sizing is based on grid space left over after establishing fixed sized and automatically sized columns and rows, the generating the fractionally weighted columns and rows comprising: determining whether at least one of a grid height and a grid width have been specified; generating the fractionally weighted rows by multiplying a normalized fractional height value with a fractional weighting assigned to the fractionally weighted rows if the grid height has not been specified; and generating the fractionally weighted columns by multiplying a normalized fractional width value with a fractional weighting assigned to the fractionally weighted columns if the grid width has not been specified; and
    formatting the content based on the generated grid, the formatting being at least one of: aligning a beginning of an element of the content with a coordinate point of the generated grid, aligning an end of the element of the content with the coordinate point of the generated grid, and aligning a center of the element of the content with the coordinate point of the generated grid.

2. The computer-readable storage media of claim 1, wherein the computer-executable instructions for generating the grid comprise further computer-executable instructions for: setting an initial width of an automatically sized column based on a largest of minimum widths obtained, by the polling, from content in the automatically sized column; and growing the automatically sized column from the established initial width in increments, that are equally applied to other automatically sized columns, so long as the content in the grid is not clipped.

3. The computer-readable storage media of claim 2, wherein the computer-executable instructions for generating the grid comprise further computer-executable instructions for: formatting content in an automatically sized row based on an established width of a column containing the content; and setting a height of the automatically sized row based on a largest height of the formatted content in the automatically sized row.

4. The computer-readable storage media of claim 1, wherein the computer-executable instructions for generating the grid comprise further computer-executable instructions for: identifying the fractional weighting assigned to the fractionally weighted columns and rows; identifying current widths of the fractionally weighted columns; identifying current heights of the fractionally weighted rows; assigning additional width, from left over grid width space, to those fractionally weighted columns whose current widths are furthest from their goal as established by the identified fractional weighting assigned to the fractionally weighted columns; assigning additional height, from left over grid height space, to those fractionally weighted rows whose current heights are furthest from their goal as established by the identified fractional weighting assigned to the fractionally weighted rows; repeating the identifying and the assigning for the fractionally weighted columns if additional left over grid width space remains; and repeating the identifying and the assigning for the fractionally weighted rows if additional left over grid height space remains.

5. The computer-readable storage media of claim 1, wherein the computer-executable instructions for generating the grid comprise further computer-executable instructions for: generating a normalized fractional height value by dividing formatted heights of the content in the fractionally weighted rows by the fractional weighting assigned to the fractionally weighted rows and selecting a largest resulting quotient; and generating a normalized fractional width value by dividing formatted widths of the content in the fractionally weighted columns by the fractional weighting assigned to the fractionally weighted columns and selecting a largest resulting quotient.

6. The computer-readable storage media of claim 1, wherein the computer-executable instructions for formatting the content based on coordinate points of the generated grid comprise computer-executable instructions for stretching the content to fill a cell of the grid with which the content is associated.

7. The computer-readable storage media of claim 1, wherein the minimum and maximum sizing information is generated in accordance with a minimum sizing scheme and an independently specifiable maximum sizing scheme that are specified by the rules.

8. The computer-readable storage media of claim 1, wherein the content is specified by an HTML file and the rules that are independent of the content are contained in a CSS file.

9. A method of generating formatted content, the formatted content being formatting content in accordance with a grid established by rules that are independent of the content, the method comprising the steps of:
  obtaining the rules defining the grid, the rules being independent of, and separate from, the content;
  polling the content for minimum and maximum sizing information;
  generating the grid in accordance with the rules, the generating the grid comprising: generating automatically sized columns and rows, whose sizing is based on the content; and generating fractionally weighted columns and rows, whose sizing is based on grid space left over after establishing fixed sized and automatically sized columns and rows, the generating the fractionally weighted columns and rows comprising: determining whether at least one of a grid height and a grid width have been specified; generating the fractionally weighted rows by multiplying a normalized fractional height value with a fractional weighting assigned to the fractionally weighted rows if the grid height has not been specified; and generating the fractionally weighted columns by multiplying a normalized fractional width value with a fractional weighting assigned to the fractionally weighted columns if the grid width has not been specified; and
  generating the formatted content by formatting the content based on the generated grid, the formatting being at least one of: aligning a beginning of an element of the content with a coordinate point of the generated grid, aligning an end of the element of the content with the coordinate point of the generated grid, and aligning a center of the element of the content with the coordinate point of the generated grid.

10. The method of claim 9, wherein the generating the grid comprises: setting an initial width of an automatically sized column based on a largest of minimum widths obtained, by the polling, from content in the automatically sized column; and growing the automatically sized column from the established initial width in increments, that are equally applied to other automatically sized columns, so long as the content in the grid is not clipped.

11. The method of claim 10, wherein the generating the grid further comprises: formatting content in an automatically sized row based on an established width of a column containing the content; and setting a height of the automatically sized row based on a largest height of the formatted content in the automatically sized row.

12. The method of claim 9, wherein the generating the grid comprises: identifying the fractional weighting assigned to the fractionally weighted columns and rows; identifying current widths of the fractionally weighted columns; identifying current heights of the fractionally weighted rows; assigning additional width, from left over grid width space, to those fractionally weighted columns whose current widths are furthest from their goal as established by the identified fractional weighting assigned to the fractionally weighted columns; assigning additional height, from left over grid height space, to those fractionally weighted rows whose current heights are furthest from their goal as established by the identified fractional weighting assigned to the fractionally weighted rows; repeating the identifying and the assigning if additional left over grid width space remains; and repeating the identifying and the assigning for the fractionally weighted rows if additional left over grid height space remains.

13. The method of claim 9, wherein the generating the grid comprises: generating a normalized fractional height value by dividing formatted heights of the content in the fractionally weighted rows by the fractional weighting assigned to the fractionally weighted rows and selecting a largest resulting quotient; and generating a normalized fractional width value by dividing formatted widths of the content in the fractionally weighted columns by the fractional weighting assigned to the fractionally weighted columns and selecting a largest resulting quotient.

14. The method of claim 9, wherein the formatting the content based on coordinate points of the generated grid comprises stretching the content to fill a cell of the grid with which the content is associated.

15. The method of claim 9, wherein the minimum and maximum sizing information is generated in accordance with a minimum sizing scheme and an independently specifiable maximum sizing scheme that are specified by the rules.

16. One or more computer-readable storage media comprising computer-executable instructions for formatting content in accordance with a grid established by rules that are independent of the content, the computer-executable instructions directed to steps comprising:
  obtaining the rules defining the grid, the rules being independent of, and separate from, the content;
  polling the content for minimum and maximum sizing information;
  generating the grid in accordance with the rules, the generating the grid comprising: generating fractionally weighted columns and rows, whose sizing is based on grid space left over after establishing fixed sized and automatically sized columns and rows; and generating automatically sized columns and rows, whose sizing is based on the content, the generating the automatically sized columns and rows comprising: setting an initial width of at least one automatically sized column based on a largest of minimum widths obtained, by the polling, from content in the at least one automatically sized column; and growing the at least one automatically sized column, from the established initial width, in increments that are equally applied to other automatically sized columns, so long as the content in the grid is not clipped; and
  formatting the content based on the generated grid, the formatting being at least one of: aligning a beginning of an element of the content with a coordinate point of the generated grid, aligning an end of the element of the content with the coordinate point of the generated grid, and aligning a center of the element of the content with the coordinate point of the generated grid.

17. The computer-readable storage media of claim 16, wherein the computer-executable instructions for generating the grid comprise further computer-executable instructions for: formatting content in an automatically sized row based on an established width of a column containing the content; and setting a height of the automatically sized row based on a largest height of the formatted content in the automatically sized row.

18. The computer-readable storage media of claim 16, wherein the computer-executable instructions for generating the grid comprise further computer-executable instructions for: determining whether at least one of a grid height and a grid width have been specified; generating the fractionally weighted rows by multiplying a normalized fractional height value with a fractional weighting assigned to the fractionally weighted rows if the grid height has not been specified; and generating the fractionally weighted columns by multiplying a normalized fractional width value with a fractional weighting assigned to the fractionally weighted columns if the grid width has not been specified.

19. The computer-readable storage media of claim 18, wherein the computer-executable instructions for generating the grid comprise further computer-executable instructions for: identifying the fractional weighting assigned to the fractionally weighted columns and rows; identifying current widths of the fractionally weighted columns; identifying current heights of the fractionally weighted rows; assigning additional width, from left over grid width space, to those fractionally weighted columns whose current widths are furthest from their goal as established by the identified fractional weighting assigned to the fractionally weighted columns; assigning additional height, from left over grid height space, to those fractionally weighted rows whose current heights are furthest from their goal as established by the identified fractional weighting assigned to the fractionally weighted rows; repeating the identifying and the assigning for the fractionally weighted columns if additional left over grid width space remains; and repeating the identifying and the assigning for the fractionally weighted rows if additional left over grid height space remains.

20. The computer-readable storage media of claim 18, wherein the computer-executable instructions for generating the grid comprise further computer-executable instructions for: generating a normalized fractional height value by dividing formatted heights of the content in the fractionally weighted rows by the fractional weighting assigned to the fractionally weighted rows and selecting a largest resulting quotient; and generating a normalized fractional width value by dividing formatted widths of the content in the fractionally weighted columns by the fractional weighting assigned to the fractionally weighted columns and selecting a largest resulting quotient.

* * * * *